April 16, 1968        G. EVERETT        3,377,986
PLASTIC DISPENSING AND DELIVERY APPARATUS
Filed Jan. 3, 1966        4 Sheets-Sheet 1
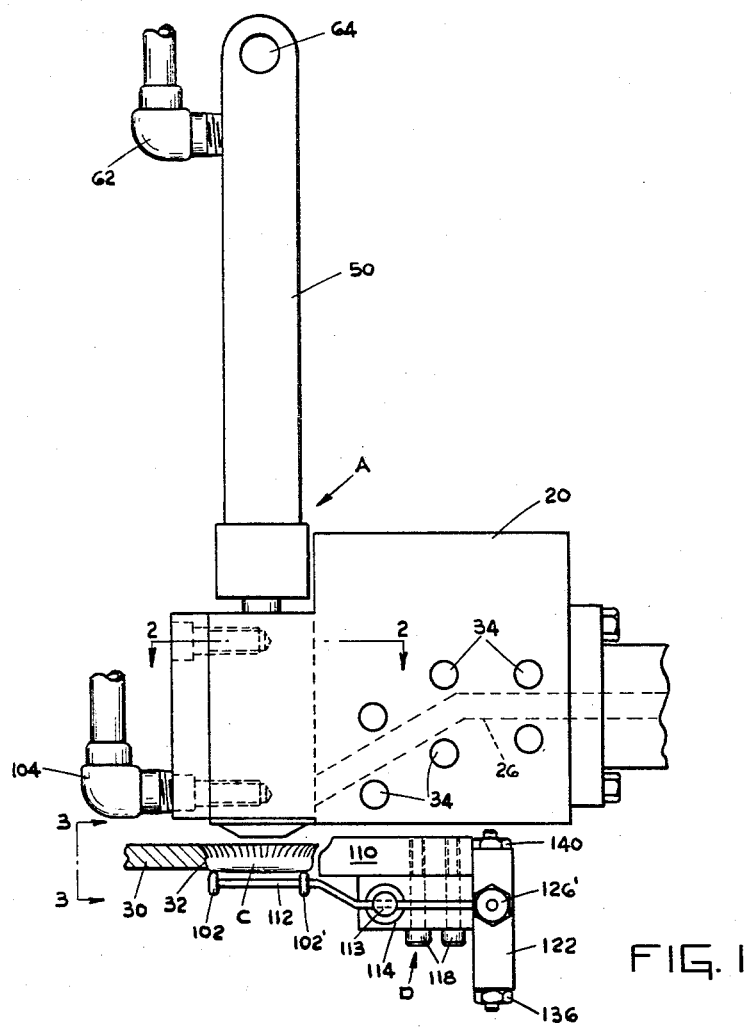
FIG. 1
FIG. 2
INVENTOR.
GEORGE EVERETT
BY 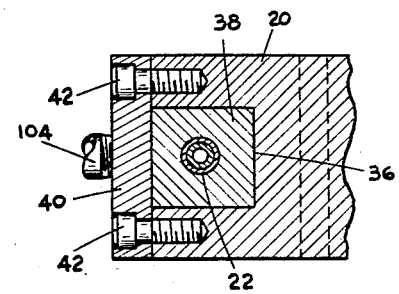
ATTORNEY

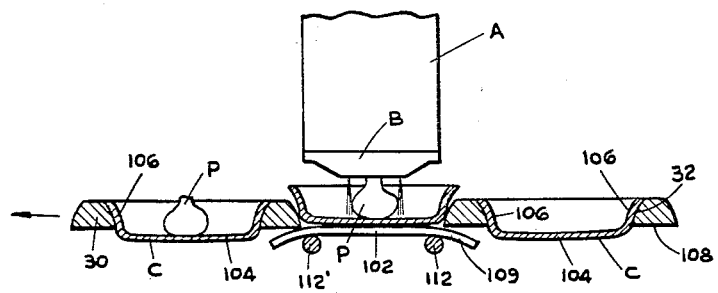
FIG.3
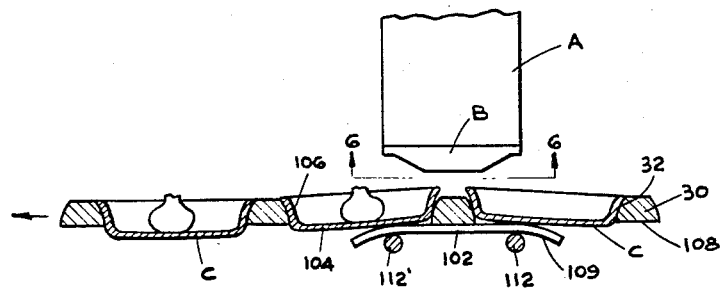
FIG.3A
FIG.5
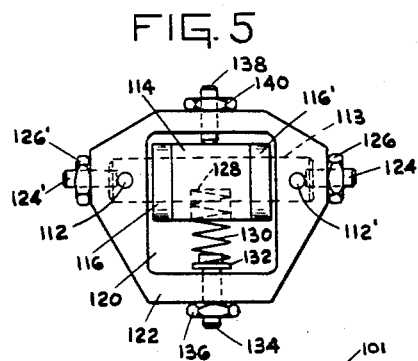
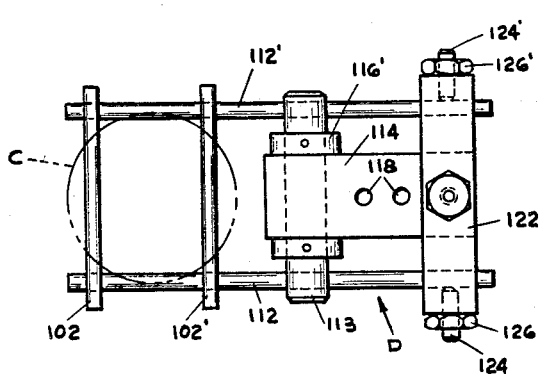
FIG.4
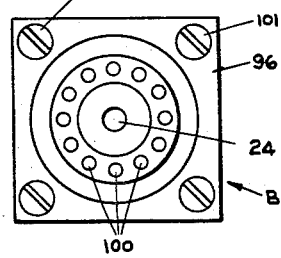
FIG.6
INVENTOR.
GEORGE EVERETT
BY Harry S. Draper
ATTORNEY

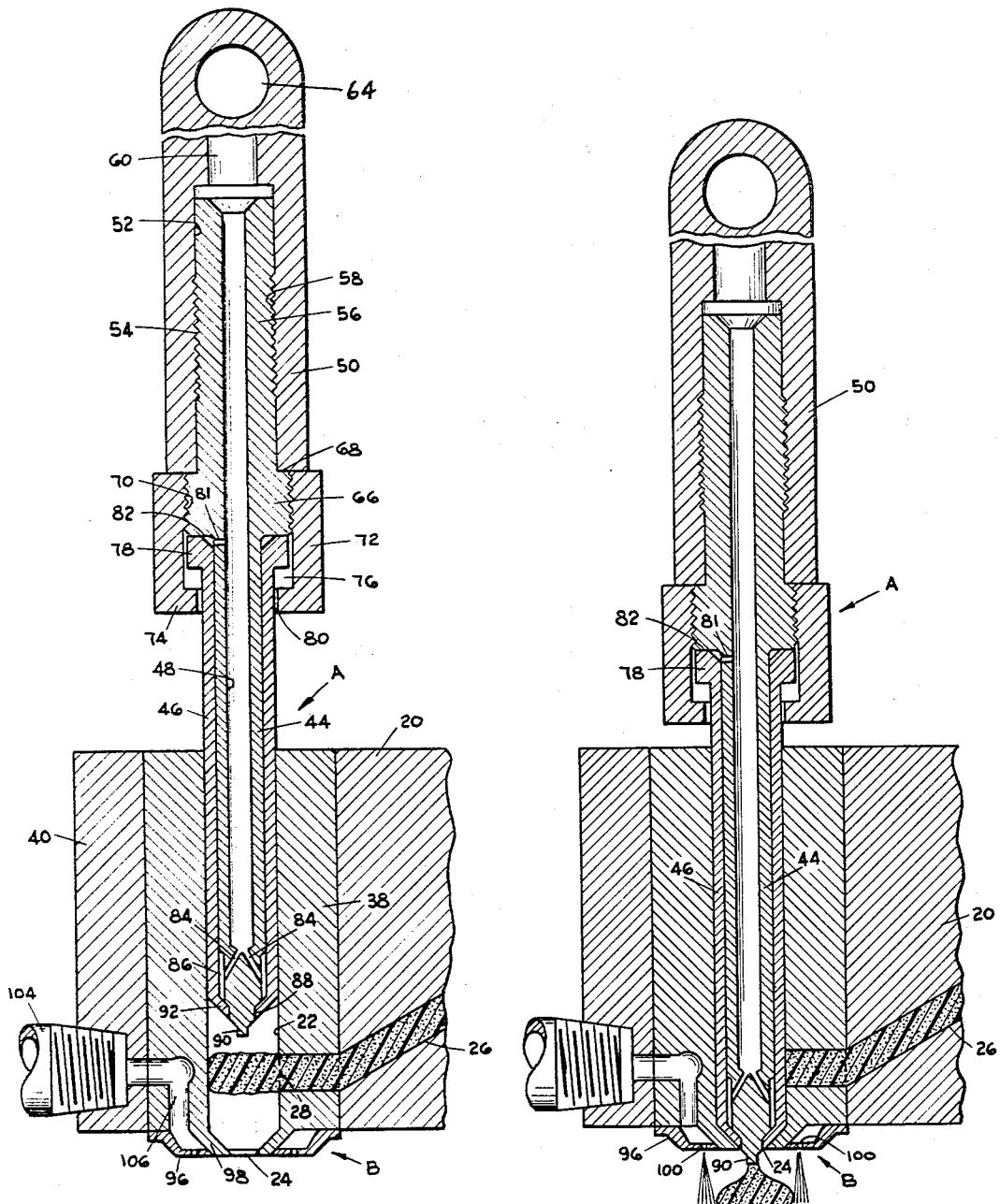

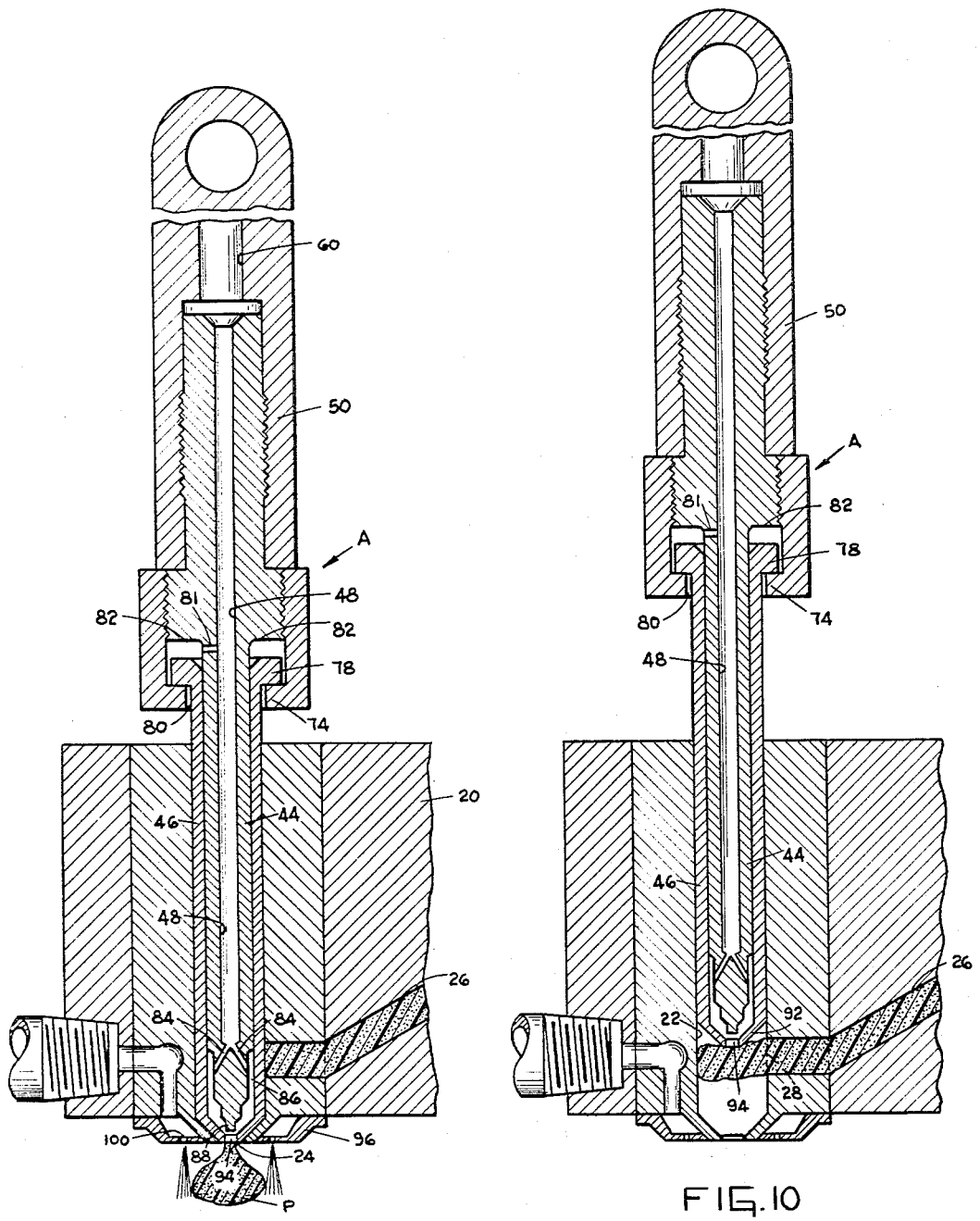

3,377,986
PLASTIC DISPENSING AND DELIVERY
APPARATUS
George Everett, Burlington, Unionville, Conn., assignor to Gros-Ite Industries, Inc., Farmington, Conn., a corporation of Connecticut
Filed Jan. 5, 1966, Ser. No. 518,926
16 Claims. (Cl. 118—317)

The invention relates to improvements in aparatus for metering or dispensing predetermined amounts of plastic material, and is more particularly directed to improvements in devices of the type disclosed in Aichele Patents Nos. 3,135,019, June 2, 1964, and 3,212,131, Oct. 19, 1965.

The devices disclosed in the aforementioned Aichele patent are suitable for dispensing moldable plastic material in accurate amounts in rapidly timed sequence for delivery into bottle caps or the like. However, at increased speeds, it has been found that the Aichele devices do not furnish adequate control of the plastic charges as they are being deposited in the successive bottle caps. The plastic charges or pellets have a tendency to twist over to the side of the dispensing orifice and as a result the charges are deposited adjacent the rims or skirts of the caps rather than in the centers of the caps. If a plastic charge is not centrally located in a cap, subsequent molding will not provide a seal liner which properly covers the base portion of the cap.

Also, in the Aichele devices the distance that the formed plastic charges must travel for delivery into the caps is too great to enable them to be adequately controlled at the extremely high speeds which it is desired to operate the machine.

A primary object of the invention is to provide means for dispensing and delivering plastic charges in a manner whereby the delivery of the plastic charges is controlled. The means for dispensing and delivering plastic charges is particularly adapted for use with apparatus for lining bottle caps to assure the central positioning of the plastic charges in the caps preliminary to molding of the plastic material.

Another object of the invention is to provide means associated with the dispensing device for delivering plastic charges to a position in alignment with the central axis of the orifice from which the plastic charges are dispensed.

A further object of the invention is to provide means associated with a movable support for bottle caps or the like to move the caps toward the dispensing orifice of the dispensing device to thereby assist in controlling the position of plastic charges in the caps.

Still another object of the invention is to provide plastic dispensing means having a simplified and improved plunger assembly.

These, and other objects and advantages of the invention will be apparent from the following detailed description, taken in conjunction with the drawings illustrating a preferred embodiment of apparatus for dispening and delivering charges of plastic material, in which:

FIG. 1 is a side elevational view showing apparatus for dispensing and delivering plastic charges associated with supporting means for conveying successive caps to the apparatus and with means for moving the caps toward dispensed plastic charges;

FIG. 2 is a horizontal cross-sectional view taken approximately in the plane of line 2—2 of FIG. 1;

FIG. 3 is a view looking in the direction of the arrows 3—3 of FIG. 1 showing means for moving caps toward the plastic dispensing means;

FIG. 3A is a view similar to FIG. 3 showing a cap as it travels into position for the delivery of a plastic charge therein;

FIG. 4 is a top plan view of the means for lifting each cap of successive caps toward the forward end of the dispensing device to thereby enable control of the dispensed plastic charge as it is deposited within each of the crowns;

FIG. 5 is a side elevational view of the means shown in FIG. 4;

FIG. 6 is a bottom plan view showing the dispensing orifice end of the dispensing device, this view looking in the direction of line 6—6 of FIG. 3A; and FIGS. 7, 8, 9 and 10 are vertical cross-sectional views showing the sequence of operations of the dispensing device and the control means associated therewith during one cycle of the device.

Referring to the drawings and as shown in FIGS. 1, 2 and 7-10, the apparatus for dispensing and delivering measured charges of plastic material comprises a block 20 having a bore 22 extending therethrough and terminating in a dispensing orifice 24. The block is provided with a plastic discharge passage 26 which is in communication with the bore 22. The exit end 28 of the discharge passage is at the bore and is spaced from the dispensing orifice 24. Plunger means A is positioned for reciprocation in the bore for movement across the exit end of the discharge passage to transfer plastic material from the discharge passage to and through the dispensing orifice. Means B is provided adjacent the dispensing orifice for directing a column of compressed air to confine and control the direction of movement of plastic charges P ejected through the dispensing orifice by the plunger means A.

The apparatus for dispensing and delivering measured charges of plastic material in accordance with the invention may be used in conjunction with any form of apparatus which requires the supply of plastic material in accurately ascertained quantities at a high rate of delivery at a predetermined point of delivery. The apparatus of the invention is particularly suitable for use in conjunction with the lining of bottle caps or the like and will be described in relation to a cap lining machine of the type disclosed in the aforementioned Aichele patents.

Accordingly, the plastic dispensing and delivering apparatus is illustrated with relationship to a conveyor 30 having openings 32 adapted to receive a plurality of bottle caps C. Preferably, the conveyor, which is partially shown in FIGS. 1, 3 and 3A, is in the form of a rotatable turntable provided at its margin with a series of circumferentially spaced, outwardly open notches. The conveyor is related to the dispensing and delivering apparatus so that successive caps C are positioned to receive a measured amount or a charge of plastic material P in each cap as it passes the dispensing and depositing apparatus. Thereafter, the thus supplied caps are delivered by the conveyor to a seal liner molding or shaping means (not shown). The support and driving means for the conveyor form no part of the present invention and may be of the structure shown in the aforementioned Aichele patents. Instead of a rotatable turntable, a conveyor which travels in a straight line may be provided to bring successive caps under the apparatus for dispensing and delivering plastic charges into the caps.

To assist the aforementioned means B acting to confine and control the direction of movement of the plastic charges P so that the plastic charges are delivered centrally within the caps, it is preferred to provide means D adjacent the dispensing and delivering apparatus to engage and individually lift the caps C toward the plastic charges as they are ejected from the dispensing orifice and guided by the means B. The means D is illustrated in FIGS. 1, 4 and 5, and the manner of its operation is illustrated in FIGS. 3 and 3A.

In greater detail, the block 20 is provided with heating coils (not shown) positioned within the apertures 34 positioned adjacent the passage 26 (FIG. 1) so that the plastic material conveyed therethrough may be maintained in a heated and plastic condition. The plastic material may be any suitable thermoplastic material such as a polyethylene composition or a vinyl resin composition. The plastic composition is maintained under pressure within the passage 26 by any suitable means such as the thermoplastic material conditioning means, including an extruder worm as shown in the aforementioned Aichele patents. The heated plastic material may be maintained in the passage 26 under pressure and fed thereto by a measuring plunger as disclosed in the Aichele patents. It is preferred, however, that the plastic material be fed through and maintained under pressure in the passage 26 without an intervening measuring plunger. As illustrated in FIG. 7, the plastic material, upon leaving the exit end 28 of the discharge passage, is positioned within the bore 22 in front of the plunger means A so that the plunger means upon its downstroke will force the charge of plastic material out through the orifice 24, as shown in FIG. 8.

Although the bore 22 may be formed to extend through the block 20, for convenience of manufacture the block is provided with a recess 36 extending vertically through the block within which there is positioned an insert 38 having the bore 22 formed to extend therethrough. As shown in FIG. 2, the insert is secured within the block by a cover plate 40 formed with openings through which screws 42 are extended and threaded into tapped holes formed in the block.

The plunger means A by its timed movement and the relationship of its parts functions to transfer a measured amount or charge of plastic material issuing from the discharge passage to the dispensing orifice and to eject the charge of plastic material from the orifice. As shown in FIGS. 7-10, the plunger means comprises an inner plunger 44 and an outer plunger 46. The inner and outer plungers are constructed and related to one another to coact at their forward ends to transfer a plastic charge to and through the dispensing orifice and to provide means for conveying compressed air to the dispensing orifice to assist in separating the formed charge from the dispensing means. Also, the inner and outer plungers are constructed and related to one another to provide valve means for the compressed air.

In greater detail, the outer plunger 46 has an outer diameter which is slightly less than the diameter of the bore 22 so that the outer plunger and the inner plunger assembled therewith may be reciprocated in the bore. The outer plunger which is hollow has an inner diameter slightly more than the outer diameter of the inner plunger so that there may be relative or sliding movement between the two plungers. The inner plunger is also hollow and has a central bore 48. As shown in FIGS. 7-10, the inner plunger 44 is fixedly connected to a plunger member 50. The inner plunger and the plunger member may be made of one piece. However, for convenience of manufacture the parts are separately made and assembled. The plunger member 50 is made with a central bore 52 and is internally threaded at 54. The inner plunger 54 is provided with an upper section 56 having an externally threaded portion 58 whereby the inner plunger and the plunger member may be screwed to one another to firmly connect the parts for movement together as a unit. The plunger member 50 is provided with a passage 60 in alignment with the bore 48 thereby providing a continuous passage in communication with an inlet 62 (FIG. 1) connected to a source of compressed air (not shown). A valve (not shown) is provided and actuated by any suitable means to allow compressed air to pass into the line intermittently at desired time intervals. Near the upper end of the plunger member 50, an opening 64 enables connection to a link which in turn may be connected to a rocker arm (not shown), or any other means for imparting reciprocation to the plunger member 50, its directly or fixedly connected inner plunger 44, and the associated outer plunger 46. The means for imparting reciprocation to the assembly may be of any suitable type, as shown for example in the aforementioned Aichele patents.

As also shown in FIGS. 7-10, the inner plunger is provided with an intermediate portion 66 having a diameter larger than the diameter of the bore 52 of the plunger member 50 whereby the upper side of the intermediate portion abuts the lower end 68 of the plunger member 50. The intermediate portion 66 is externally threaded for mating engagement with the internally threaded portion 70 of a collar 72. The collar is provided at its lower end with an inturned flange or shoulder 74 located in vertically spaced relationship with respect to the intermediate portion 66 of the inner plunger. The space between the flange 74 and the intermediate portion of the inner plunger provides an annular recess 76 within which is received an external, annular flange 78 at the upper end of the outer plunger 46. This flange has an external diameter less than the internal diameter of the collar and greater than the diameter of the central opening 80 defined by the collar flange 74. The central opening 80 has a diameter to furnish more than the small amount of clearance needed to merely permit relative sliding movement between the collar 72 and the outer plunger 46. The purpose of such clearance and the provision of a related venting means or opening 81 extending through the wall of the inner plunger just below the shoulder 82 furnished by the underside of the plunger's intermediate portion 66 will be subsequently explained. As illustrated, the outer plunger flange 78 may move between the collar flange 74 and the shoulder 82. Such arrangement, together with the stop means provided by the lower end of the inner plunger, as will subsequently be described, determines the extent of relative movement of the outer plunger with respect to the inner plunger.

As also shown in FIGS. 7-10, the lower end of the inner plunger 44 is provided with a plurality of radially extending passages 84 in communication with the bore 48 (also the passage 60 of plunger member 50) and the inner plunger's outer diameter. The diameter of the inner plunger is reduced in the area adjoining the passages 84 to provide an increased space 86 between the outer diameter of the inner plunger and the inner diameter of the outer plunger. The inner plunger is further reduced in diameter in two additional steps or sections, at 88 and 90. The outer plunger has the wall thereof inwardly directed or conically formed at 92 for mating engagement with the inner plunger at the section 88, such section acting as a stop to limit the extent of downward movement of the outer plunger with respect to the inner plunger. Also, as will be subsequently described, the relationship of the end of the wall portion 92 and the wall at the section 88 functions as a valve for the compressed air in the passage 60, the bore 48 and the radial passages 84. The outer plunger is provided with the central opening 94 (FIGS. 9 and 10) to receive the inner plunger section 90 with a close fit. The tip 90 of the inner plunger is adapted to extend through the dispensing orifice 24 (FIG. 8).

The dispensing orifice 24, while it may be formed in the insert 38 or the block 20, is more conveniently provided in the means B which is also constructed to direct a column of air to confine and control the direction of movement of a plastic charge as it leaves the dispensing orifice. Accordingly, and as shown in FIGS. 7–10, the means B, which in the form of the invention illustrated is a plate 96, is formed on its inner side with a conical portion 98 for mating engagement with the conically formed portion 92 of the outer plunger.

As shown in FIGS. 6–10, the plate 96 is provided with a series of air passages 100 which are circumferentially spaced and surround the dispensing orifice 24. The plate is connected to the block 20 or its insert 38 by screws 101 (FIG. 6). As shown in FIGS. 7–10, the passages 100 are in communication with a second source of compressed air (not shown) through the medium of an inlet fixture 104 and the passage 106 extending through the insert 38 and the plate 40. The compressed air is directed through the series of air passages 100 in timed intervals by any suitable means such as a solenoid actuated valve (not shown).

The sequence of a cycle of operation of the apparatus is illustrated in FIGS. 7–10. At the beginning of the cycle, the relationship of the inner and outer plungers 44 and 46 is as shown in FIG. 7. At this stage, the plastic material under pressure in the passage 26 has issued into the bore 22 in front of the inner and outer plungers which are in engagement at their lower ends or at the section 88 of the inner plunger, the shoulder 82 of the inner plunger is in engagement with the outer plunger flange 78 so that the downward movement of the plunger member 50 causes the inner and outer plungers to move down together, whereupon the plastic material in the bore is pushed or transferred down and through the dispensing orifice as shown in FIG. 8. As the plunger assembly moves down, the valve provided by the engagement of the end of the outer plunger with the section 88 of the inner plunger is closed. While there is air in the line, the air is not under positive pressure because at this stage the valve which allows compressed air to pass into the line is closed. Also, upon downward movement of the plunger assembly, the exit end 28 of the passage 26 is covered or blocked by the adjoining wall of the outer plunger, whereupon the pressure upon the plastic material in the passage 26 is increased for the time interval that the exit end of the passage is blocked.

As shown in FIG. 8, when the plastic charge P is ejected from the orifice, it tends to stick or adhere to the foremost end of the plunger assembly, or the tip 90 of the inner plunger. Also, the plastic material has a tendency to twist over to a side rather than staying centrally in alignment with the orifice through which it has been ejected. To control and maintain the plastic charge in alignment with the central axis of the dispensing orifice and of the plunger assembly, compressed air is directed through the passages 100 to surround the plastic charge. The compressed air acts as a confining column or curtain to prevent the plastic charge from twisting or moving off center. The compressed air for maintaining the plastic charge centrally is directed about the plastic charge before the plunger assembly begins its upward stroke. In the relationship of the parts as shown in FIG. 8, the shoulder 82 is still in engagement with the outer plunger flange 78 and the vent opening 81 is closed.

Upon the return stroke, as shown in FIG. 9, the inner plunger 44 is positively moved up, and in so doing, the charge P is drawn back to the dispensing orifice because of the adhesive character of the plastic material. Such character of the plastic material also tends to cause it to adhere to the forward edge of the outer plunger 46. However, the upward movement of the inner plunger opens the valve provided by the engagement of the inner and outer plungers at 88, 90, whereby the air in the line provided by the passage 60, the bore 48, and the radial passages 84 is given increased space within which to expand, thereby lowering the air pressure in the line. As a result, a vacuum is created tending to pull the plastic charge up into the space created between the ends of the plungers 44 and 46. The vacuum, however, is broken when the outer plunger 46 at the flange 78 moves away from the vent opening 81 (compare FIGS. 8 and 9). The air in the line is bled off out of the vent 81. Then, compressed air is allowed into the line by the intermittently actuated valve related to the inlet 62. The blast of air separates the plastic charge from the adjoining edge of the outer plunger and ejects the charge under the control of the surrounding curtain of compressed air from the second source of compressed air emitted from the passages 100. The bleed off is completed when the flange 78 is returned to engagement with the shoulder 82 at the beginning of the cycle as shown in FIG. 7, air passing around the flange 78 and out through the opening 80 to the atmosphere.

Also on the return stroke, and as shown in FIG. 9, the outer plunger flange 78 is engaged by the collar flange 74. As a result, the outer plunger 46 is moved upwardly to the point where the exit end 28 of the discharge passage is uncovered, as shown in FIG. 10, thereby permitting a predetermined amount of plastic material to enter the bore for the next downstroke of the plunger assembly. The downward movement of the plunger 50, and thereby the flanged collar 72, causes the flange 74 to move out of engagement with the flange 78 as shown in FIG. 10 to where the flange 78 engages the shoulder 82 as shown in FIG. 7. The valve provided by the engagement of the forward end of the outer plunger with the section 88 of the inner plunger is closed. Also, the vent 81 is closed.

Where, as previously indicated, it is preferred that the dispensing and delivering apparatus be used as part of a machine for lining bottle caps, the means D moves the individual caps C toward the dispensing orifice 24 of the apparatus to further control the delivery of the plastic charges.

The means D is positioned adjacent the dispensing and delivering means and comprises means to engage and individually lift the caps toward the dispensing orifice as plastic charges are delivered into the caps. In the illustrated embodiment of the invention, the engaging and lifting means comprises spaced guiding and lifting fingers 102, 102' adapted to engage the underside of the base portions 104 of the caps C. It will be understood, however, that an appropriately formed plate may be used in lieu of the fingers.

As shown in FIGS. 3 and 3A, the caps C each have skirts 106 by which the caps are supported or suspended in the openings 32 in the conveyor 30. As shown, the base portion 104 of each cap is normally below the level of the underside 108 of the conveyor. The support fingers 102, 102' are maintained in engagement with the underside of the conveyor, and by making the fingers so that they are curved downwardly at their leading ends 109, the caps ride up on the fingers. Each cap is lifted at the point where it is under the dispensing and delivering apparatus to receive a plastic charge. Continued movement of the conveyor 30 in the direction indicated by the arrow moves each cap with a plastic charge centrally positioned therein out from under the dispensing and delivering apparatus. Upon leaving the fingers, the cap returns from its raised level; the skirt 106 of the cap returns into mating engagement with the wall portion of the conveyor surrounding the notch 32. As shown in prior art, a guide rail 110 (FIG. 1) is mounted adjacent the outer periphery of the conveyor to prevent the caps from moving out of the notches.

As shown in FIG. 4, the fingers 102 102' are laterally spaced apart a distance slightly less than the diameter of a cap at its base portion. The fingers are supported upon the forward ends of a pair of transversely spaced rods 112, 112', the fingers being connected to the rods as by welding. The assembly or framework of the fingers and the rods supporting them are resiliently mounted to absorb vibration and for adjustability. Also, the resilient mounting permits a cap raised by the fingers to absorb the force or pressure caused by a charge P being pressed against the inside surface of a cap's base portion.

As shown in FIGS. 1, 4 and 5, the supporting rods 112, 112' are extended through a pivot member 112 just inward of each end thereof. The pivot member is positioned to extend through the forward end of a pivot holder 14, the rods being positioned on each side of the holder, as shown in FIG. 4. Collars 116, 116' provided with set screws permit the framework of fingers and rods, together with the pivot member to be adjusted in a plane parallel to the line of movement of the caps under the plastic dispensing apparatus, and then secured in desired position. The pivot holder 114 is secured to the underside of the guide rail 110 as by screws 118 (FIG. 1). The rear end of the pivot holder extends into an opening 120 formed in an end housing 122, as shown in FIG. 4.

The framework of the fingers 102, 102' and its supporting rods 112, 112' is adjustable in a plane perpendicular to the line of movement of the caps under the plastic dispensing and delivery apparatus. For this purpose, the end housing receives the rear ends of the rods 112, 112', and has set screws 124, 124' extended into its sides for engagement with the rods. As shown in FIGS. 4 and 5, lock nuts 126, 126' are associated with the set screws.

The guiding fingers 102, 102' are also mounted for adjustment in the third plane, or vertically with respect to the level of movement of the conveyor. Further, the cap engaging means are resiliently mounted. The rear end of the pivot holder 114 extends into the end housing opening 120. The pivot holder is provided with a recess 128 on its underside to receive one end of a helically coiled compression spring 130 as shown in FIG. 5. The opposite end of the spring bears against a washer 132 on a threaded pin 134 which extends through a tapped hole in the end housing. A lock nut 136 is associated with the pin for the spring. The opposite side of the end housing is also provided with a tapped hole through which is extended a set screw 138, the inner end of which engages the pivot holder 114. A lock nut 140 is associated with this set screw. The above described arrangement permits the end housing 122 to be vertically adjusted about the axis of the pivot member 113, whereby the position of the fingers 102, 102' is vertically adjustable, and the fingers are resiliently mounted.

It is believed that the advantages and improved results of the plastic dispensing and delivering apparatus of the invention will be apparent from the foregoing detailed description of a preferred embodiment thereof. It will be apparent that various changes and modifications may be made to the illustrated preferred embodiment of the invention which has been described without departing from the spirit and scope of the invention as sought to be defined in the following claims.

I claim:

1. Apparatus for dispensing and delivering measured charges of plastic material comprising conveyor means, a block having a bore extending therethrough terminating in a dispensing orifice, a plastic discharge passage in the block in communication with said bore, the exit end of the discharge passage being spaced from said dispensing orifice, reciprocable plunger means positioned in the bore for movement across the exit end of the discharge passage to transfer measured charges of plastic material to and through said dispensing orifice, said dispensing orifice being above and adjacent to said conveyor means, and means adjacent and surrounding the dispensing orifice for directing an annular column of air to confine and control the direction of movement of the dispensed charges of plastic material with respect to said conveyor means.

2. Apparatus as set forth in claim 1, wherein the means adjacent the dispensing orifice for directing a column of air to confine and control the direction of movement of the dispensed charges of plastic material comprises a plate secured to the block, said plate having a plurality of air passages surrounding the dispensing orifice.

3. Apparatus as set forth in claim 1, wherein the means adjacent the dispensing orifice for directing a column of air to confine and control the direction of movement of the dispensed charges of plastic material comprises a plate secured to said block, said plate having a central aperture to provide the dispensing orifice, and a plurality of air passages surrounding the central aperture.

4. Apparatus as set forth in claim 1, wherein the reciprocable plunger means comprises an inner plunger and an outer plunger, said plungers being related to one another to coact at their forward ends to transfer measured charges of plastic material to and through the dispensing orifice and to provide means for conveying compressed air to the dispensing orifice to assist in separating the charges of plastic material from the dispensing means.

5. Apparatus as set forth in claim 1, wherein the reciprocable plunger means comprises an inner plunger and an outer plunger, the outer plunger having an outer diameter slightly less than the diameter of the bore for a close sliding fit therein, the outer plunger being hollow and having an inner diameter slightly more than the outer diameter of the inner plunger extending therein, the outer plunger being mounted for sliding movement with respect to the inner plunger, cooperable means provided by the inner and outer plungers to limit the extent of relative movement of the outer plunger with respect to the inner plunger, said inner plunger having a bore providing a passage for compressed air, the forward end of the outer plunger having a central opening to receive the forward end of the inner plunger, the forward extremity of the inner plunger being adapted to extend through the dispensing orifice, the inner and outer plungers being formed at their forward ends to provide valve means for said inner plunger passage, and vent means extending through the wall of the inner plunger adapted to be covered and uncovered by the outer plunger.

6. Apparatus as set forth in claim 1, wherein the reciprocable plunger means comprises an inner plunger and an outer plunger, the outer plunger having an outer diameter slightly less than the diameter of the bore for a close sliding fit therein, the outer plunger being hollow and having an inner diameter slightly more than the outer diameter of the inner plunger extending therein, the outer plunger being mounted for sliding movement with respect to the inner plunger, cooperable means provided by the inner and outer plungers to limit the extent of relative movement of the outer plunger with respect to the inner plunger, said inner plunger having a bore providing a passage for compressed air, the forward end of the outer plunger having a central opening to receive the forward end of the inner plunger, the forward extremity of the inner plunger being adapted to extend through the dispensing orifice, the inner and outer plungers being formed at their forward ends to provide valve means for said inner plunger passage, vent means extending through the wall of the inner plunger adapted to be covered and uncovered by the outer plunger; wherein the means adjacent the dispensing orifice for directing a column of air to confine and control the direction of movement of the dispensed charges of plastic material comprises a plate secured to said block, said plate having a central aperture to provide the dispensing orifice, and a plurality of air passages surrounding the central aperture.

7. Apparatus for dispensing and delivering measured charges of plastic material into bottle caps or the like, said apparatus comprising a conveyor having spaced openings adapted to receive caps for support on the conveyor, the caps in the openings being supported by the skirts thereof with the base portions of the caps lying in a plane below the underside of the conveyor, means adjacent the conveyor for dispensing and delivering measured charges of plastic material directly into successive caps at intervals corresponding to the spacing of the openings in the conveyor, said means comprising a block having a bore extending therethrough and terminating in a dispensing orifice, a plastic discharge passage in the block in communication with said bore, the exit end of the discharge passage being spaced from said dispensing orifice, reciprocable plunger means positioned in the bore for movement across the exit end of the discharge passage to transfer measured charges of plastic material to and through said dispensing orifice, said dispensing orifice being above and adjacent to said conveyor, means adjacent and surrounding the dispensing orifice for directing an annular column of air to confine and control the direction of movement of the dispensed charges of plastic material into successive caps, and means adjacent the dispensing and delivering means to engage and individually lift the caps as measured charges of plastic material are delivered into the caps.

8. Apparatus as set forth in claim 7, wherein the reciprocable plunger means comprises an inner plunger and an outer plunger, said plungers being related to one another to coact at their forward ends to transfer measured charges of plastic material to and through the dispensing orifice and to provide means for conveying compressed air to the dispensing orifice to assist in separating the charges of plastic material from the dispensing means.

9. Apparatus as set forth in claim 7, wherein the reciprocable plunger means comprises an inner plunger and an outer plunger, the outer plunger having an outer diameter slightly less than the diameter of the bore for a close sliding fit therein, the outer plunger being hollow and having an inner diameter slightly more than the outer diameter of the inner plunger extending therein, the outer plunger being mounted for sliding movement with respect to the inner plunger, cooperable means provided by the inner and outer plungers to limit the extent of relative movement of the outer plunger with respect to the inner plunger, said inner plunger having a bore providing a passage for compressed air, the forward end of the outer plunger having a central opening to receive the forward end of the inner plunger, the forward extremity of the inner plunger being adapted to extend through the dispensing orifice, the inner and outer plungers being formed at their forward ends to provide valve means for said inner plunger passage, and vent means extending through the wall of the inner plunger adapted to be covered and uncovered by the outer plunger.

10. Apparatus as set forth in claim 7, wherein the means adjacent the dispensing orifice for directing a column of air to confine and control the direction of movement of the dispensed charges of plastic material comprises a plate secured to the block, said plate having a plurality of air passages surrounding the dispensing orifice.

11. Apparatus as set forth in claim 7, wherein the means adjacent the dispensing orifice for directing a column of air to confine and control the direction of movement of the dispensed charges of plastic material comprises a plate secured to said block, said plate having a central aperture to provide the dispensing orifice, and a plurality of air passages surrounding the central aperture.

12. Apparatus as set forth in claim 7, wherein the means adjacent the dispensing and delivering means to engage and individually lift the caps as measured charges of plastic material are delivered into the caps comprises spaced fingers maintained in engagement with the underside of the conveyor, said fingers being curved downwardly at their leading ends whereby the base portions of the caps which normally lie below the level of the underside of the conveyor ride up on the fingers, and means for resiliently supporting said fingers.

13. Apparatus as set forth in claim 7, wherein the means adjacent the dispensing and delivering means to engage and individually lift the caps as measured charges of plastic material are delivered into the caps comprises, spaced fingers maintained in engagement with the underside of the conveyor, said fingers being curved downwardly at their leading ends whereby the base portions of the caps which normally lie below the level of the underside of the conveyor ride up on the fingers, means for resiliently supporting said fingers, and means for adjusting the position of the fingers toward and away from the underside of the conveyor, parallel to the direction of movement of the caps with the conveyor, and transversely to said direction of movement.

14. Apparatus as set forth in claim 7, wherein the reciprocable plunger means comprises an inner plunger and an outer plunger, the outer plunger having an outer diameter slightly less than the diameter of the bore for a close sliding fit therein, the outer plunger being hollow and having an inner diameter slightly more than the outer diameter of the inner plunger extending therein, the outer plunger being mounted for sliding movement with respect to the inner plunger, cooperable means provided by the inner and outer plungers to limit the extent of relative movement of the outer plunger with respect to the inner plunger, said inner plunger having a bore providing a passage for compressed air, the forward end of the outer plunger having a central opening to receive the forward end of the inner plunger, the forward extremity of the inner plunger being adapted to extend through the dispensing orifice, the inner and outer plungers being formed at their forward ends to provide valve means for said inner plunger passage, vent means extending through the wall of the inner plunger adapted to be covered and uncovered by the outer plunger; wherein the means adjacent the dispensing orifice for directing a column of air to confine and control the direction of movement of the dispensed charges of plastic material comprises a plate secured to said block, said plate having a central aperture to provide the dispensing orifice, and a plurality of air passages surrounding the central aperture.

15. Apparatus as set forth in claim 7, wherein the reciprocable plunger means comprises an inner plunger and an outer plunger, the outer plunger having an outer diameter slightly less than the diameter of the bore for a close sliding fit therein, the outer plunger being hollow and having an inner diameter slightly more than the outer diameter of the inner plunger extending therein, the outer plunger being mounted for sliding movement with respect to the inner plunger, cooperable means provided by the inner and outer plungers to limit the extent of relative movement of the outer plunger with respect to the inner plunger, said inner plunger having a bore providing a passage for compressed air, the forward end of the outer plunger having a central opening to receive the forward end of the inner plunger, the forward extremity of the inner plunger being adapted to extend through the dispensing orifice, the inner and outer plungers being formed at their forward ends to provide valve means for said inner plunger passage, vent means extending through the wall of the inner plunger adapted to be covered and uncovered by the outer plunger; wherein the means adjacent the dispensing orifice for directing a column of air to confine and control the direction of movement of the dispensed charges of plastic material comprises a plate secured to said block, said plate having a central aperture to provide the dispensing orifice, a plurality of air passages surrounding the central aperture; and wherein the means adjacent the dispensing and delivering means to engage and individually lift the caps as measured charges of plastic material are delivered into the caps comprises spaced fingers maintained in engagement with the underside of the conveyor, said fingers being curved downwardly at their leading ends whereby the base portions of the caps which normally lie below the level of the underside of the conveyor ride up on the fingers, and means for resiliently supporting said fingers.

16. Apparatus as set forth in claim 15, wherein means are provided for adjusting the position of the fingers, said means permitting adjustment of the fingers toward and away from the underside of the conveyor, parallel to the direction of movement of the caps with the conveyor, and transversely to said direction of movement.

References Cited

UNITED STATES PATENTS

| | | | |
|---|---|---|---|
| 1,389,593 | 9/1921 | Millar | 239—290 |
| 1,990,823 | 2/1935 | Gustafsson | 239—290 X |
| 2,516,908 | 8/1950 | Pottle | 118—317 X |
| 3,212,131 | 10/1965 | Aichele | 18—5 |

CHARLES A. WILLMUTH, *Primary Examiner.*

J. P. McINTOSH, *Assistant Examiner.*